Patented Feb. 16, 1937

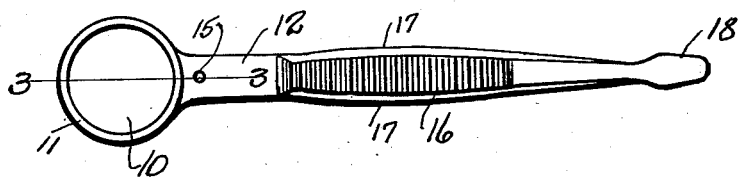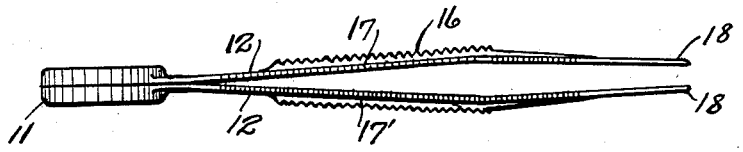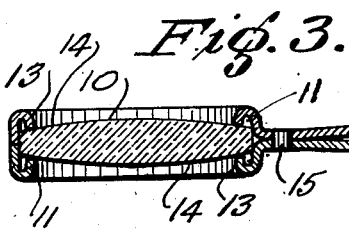

2,070,798

UNITED STATES PATENT OFFICE 2,070,798

COMBINATION MAGNIFYING GLASS AND TONGS

Elden Guy Mason, Burbank, Calif.

Application May 10, 1935, Serial No. 20,807

2 Claims. (Cl. 88—39)

My invention relates to a philatelic instrument, and to improvements in the mounting of a magnifying glass on the end of a pair of tongs so that the two instruments are fixedly secured to each other. When examining stamps, small parts, or the like that are handled with the tongs it is often necessary to look through a magnifying glass to more clearly see the stamps or small parts and heretofore it has been the custom to have the tongs and magnifying glass separate often meaning that one instrument is lost under papers on a desk or tools on a bench, thus valuable time is saved by combining these two instruments. The combination tongs and magnifying glass has graduations along the legs of the tongs for measuring the stamps or parts being examined so that the stamp can be placed under the leg and the distance accurately measured. Each leg can have a different graduation so that a number of different scales are provided. One leg being graduated metric, another inches, another can have two graduations thereon while the last leg can also be graduated with a number of graduations thereon. In the examination of stamps it is often desired to measure the perforations to determine the value of the stamp and by having these legs graduated I eliminate the necessity of having a number of separate scales for these measurements.

Another novel improvement of my invention is in the simple construction of the device consisting of two legs, both made from the same die, varying only in their graduations, so shaped as to contain the magnifying glass and all held together with a single rivet.

My improvements consist in the novel construction, arrangement of parts and the combination of a magnifying glass and pair of tongs, hereinafter fully, clearly and concisely set forth in my specification, pointed out in my claims and illustrated by the accompanying drawing, in which—

Figure 1 is a plan view of my invention.
Figure 2 is a side elevation of my invention.
Figure 3 is an enlarged sectional view taken on line 3—3 of Figure 1, being broken away to show the method of securing the magnifying glass.

Referring to the drawing by numerals, 10 designates a magnifying glass being held in place between cups 11 formed in the end of legs 12 so that ends, or rims 13 contact curved surface 14 of magnifying glass 10 when legs 12 are riveted together by rivet 15.

Center section 16 of legs 12 are knurled for gripping. The edges of legs 12 are graduated in various scales as shown at 17 and 17' for measuring stamps or any other thing to be measured. Tongs have ends 18 which may be of any desired shape, being shown as a spade end, with which the stamp is handled by pressing the knurled portions 16 together causing the ends 18 to grip the stamps, or small parts. When the invention is carried in a pocket the magnifying glass end tends to keep the instrument from slipping out and being lost.

Having thus described my invention, I claim:

1. A philatelic instrument for handling postage stamps consisting of two elongated blades each having a flanged ring at one end and a gripping part at the central portion thereof, a magnifying glass between the flanged rings, and means adjoining the rings extending through the blades for rigidly holding said blades together thereby securely holding the magnifying glass between the flanges, said blades being provided adjoining the gripping portions with measuring scales for measuring postage stamps, and having spade points at their other ends for handling stamps.

2. An instrument for handling stamps comprising two elongated flexible arms each having a flanged ring at one end, a magnifying glass between the flanged rings, and means adjoining the rings extending through the flexible arms for securely holding said arms together, thereby rigidly holding the magnifying glass between the flanges, the said elongated flexible arms being provided at their other ends with spade points for handling stamps.

ELDEN GUY MASON.